(12) United States Patent
Hino et al.

(10) Patent No.: US 9,799,249 B2
(45) Date of Patent: Oct. 24, 2017

(54) OPTICAL DEVICE AND IMAGE DISPLAY APPARATUS

(71) Applicant: Seiko Epson Corporation, Tokyo (JP)

(72) Inventors: Makiko Hino, Matsumoto (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/163,988

(22) Filed: May 25, 2016

(65) Prior Publication Data

US 2016/0363841 A1 Dec. 15, 2016

(30) Foreign Application Priority Data

Jun. 9, 2015 (JP) ................. 2015-116837

(51) Int. Cl.
*G03B 21/28* (2006.01)
*G09G 3/00* (2006.01)
*G02B 27/01* (2006.01)
*G03B 21/14* (2006.01)
*G03B 21/00* (2006.01)

(52) U.S. Cl.
CPC ............ *G09G 3/007* (2013.01); *G02B 27/01* (2013.01); *G02B 27/017* (2013.01); *G02B 27/0172* (2013.01); *G03B 21/005* (2013.01); *G03B 21/14* (2013.01); *G03B 21/28* (2013.01); *G02B 2027/0118* (2013.01); *G02B 2027/0154* (2013.01); *G03B 2205/0069* (2013.01)

(58) Field of Classification Search
CPC ...... G03B 21/005; G03B 21/14; G03B 21/28; G03B 21/145
See application file for complete search history.

(56) References Cited

U.S. PATENT DOCUMENTS

| | | | | |
|---|---|---|---|---|
| 8,562,148 B2 * | 10/2013 | Horiguchi | ............... | G03B 21/14 345/98 |
| 8,994,764 B2 | 3/2015 | Watanabe | | |
| 9,442,353 B2 * | 9/2016 | Kadotani | ............ | G03B 21/2033 |
| 2005/0275810 A1 * | 12/2005 | Choi | .................. | G02B 26/0875 353/69 |
| 2008/0218109 A1 * | 9/2008 | Komori | ..................... | G03B 9/02 318/437 |
| 2012/0062969 A1 * | 3/2012 | Watanabe | ............ | G02B 26/105 359/198.1 |
| 2016/0187645 A1 | 6/2016 | Mizoguchi et al. | | |

FOREIGN PATENT DOCUMENTS

| | | |
|---|---|---|
| JP | 2011-203460 A | 10/2011 |
| JP | 2016-126103 A | 7/2016 |
| JP | 2016-142863 A | 8/2016 |
| JP | 2016-143989 A | 8/2016 |

* cited by examiner

*Primary Examiner* — Sultan Chowdhury
(74) *Attorney, Agent, or Firm* — Harness, Dickey & Pierce, P.L.C.

(57) ABSTRACT

An optical device includes a glass plate, a movable unit that supports the glass plate, axis portions that swingably support the movable unit around a swing axis, a support unit that supports the axis portions and, a permanent magnet that is provided in the movable unit, and coils that are disposed to face the permanent magnet and generate a magnetic field to be applied to the permanent magnet. The movable unit includes a through hole that the permanent magnet is inserted into and a protrusion portion that protrudes inside the through hole to support the permanent magnet.

20 Claims, 10 Drawing Sheets

OPTICAL DEVICE AND IMAGE DISPLAY APPARATUS

BACKGROUND

1. Technical Field

The present invention relates to an optical device and an image display apparatus.

2. Related Art

To cause the resolutions of images to be projected to be higher than the resolutions of optical modulation devices such as liquid crystal panels in related art, there are technologies for shifting the axis of video light exited from the light modulation devices, as in JP-A-2011-203460. In JP-A-2011-203460, a wobbling device including an optical transmission plate and a driving unit (piezoelectric element) swaying the optical transmission plate is used as a device shifting the axis of video light.

In the wobbling device of JP-A-2011-203460, the configuration of the driving unit is not clearly disclosed. In the wobbling device, the configuration of the driving unit has a considerable influence on driving precision of the optical transmission plate. Therefore, depending on the configuration of the driving unit of JP-A-2011-203460, there is a concern of the optical transmission plate not swaying with high precision and display characteristics deteriorating.

SUMMARY

An advantage of some aspects of the invention is that it provides an optical device with excellent driving precision and an image display apparatus including the optical device.

The invention can be implemented as the following configurations.

An optical device according to an aspect of the invention includes: an optical unit that has a light incident surface on which light is incident; a movable unit that supports the optical unit; an axis portion that swingably supports the movable unit around a swing axis; a support unit that supports the axis portion; a permanent magnet that is provided in the movable unit; and a coil that generates a magnetic field to be applied to the permanent magnet. The movable unit includes a through hole into which the permanent magnet is inserted and a protrusion portion protruding inside the through hole and supporting the permanent magnet.

Accordingly, since the permanent magnet and the coil can be positioned with high precision, the optical device having excellent driving precision can be obtained.

In the optical device according to the aspect of the invention, it is preferable that the permanent magnet and the coil are disposed to face each other, and the through hole is provided to be penetrated through the movable unit in an arrangement direction of the permanent magnet and the coil.

With this configuration, the separate distance between the permanent magnet and the coil can be controlled with higher precision.

In the optical device according to the aspect of the invention, it is preferable that the protrusion portion supports a surface of the permanent magnet on a side of the coil.

With this configuration, it is possible to control the separate distance between the permanent magnet and the coil with higher precision.

In the optical device according to the aspect of the invention, it is preferable that, in a plan view of the movable unit, the permanent magnet includes a portion located outside an outer circumference of the coil, and in the plan view of the movable unit, the protrusion unit supports the portion of the permanent magnet located outside the outer circumference of the coil.

With this configuration, it is possible to prevent the protrusion portion and the coil from coming into contact with each other. Further, it is possible to dispose the coil and the permanent magnet more closely.

In the optical device according to the aspect of the invention, it is preferable that, in the plan view of the movable unit, the protrusion portion is provided not to overlap the coil.

With this configuration, it is possible to prevent the protrusion portion and the coil from coming into contact with each other. Further, it is possible to dispose the coil and the permanent magnet more closely.

In the optical device according to the aspect of the invention, it is preferable that a separate distance between the permanent magnet and the coil is less than a thickness of the protrusion portion in an arrangement direction of the permanent magnet and the coil.

With this configuration, it is possible to decrease the separate distance between the permanent magnet and the coil. Therefore, since the magnetic field generated from the coil is applied to the permanent magnet, more excellent driving efficiency can be obtained.

In the optical device according to the aspect of the invention, it is preferable that, in the plan view of the movable unit, the permanent magnet and the coil are each formed in a rectangular shape, both ends of the permanent magnet in a longitudinal direction are located outside the outer circumference of the coil, and the protrusion portion supports the both ends of the permanent magnet.

In this way, since the protrusion portion supports both ends of the permanent magnet in the longitudinal direction, an increase in the mass of the permanent magnet can be suppressed compared to, for example, a case in which both ends of the permanent magnet in a transverse direction (shorter axis) are supported by the protrusion portion.

In the optical device according to the aspect of the invention, the permanent magnet preferably extends in a direction intersecting in an arrangement direction of the optical unit and the permanent magnet.

Accordingly, since the permanent magnet can be disposed to be close to the optical unit, the moment of inertia of the movable unit can be reduced. Therefore, it is possible to swing the movable unit more smoothly.

In the optical device according to the aspect of the invention, it is preferable that the permanent magnet is provided between the two coils.

With this configuration, it is possible to swing the movable unit more smoothly.

In the optical device according to the aspect of the invention, it is preferable that the optical unit transmits the light.

With this configuration, the optical axis of the light can be shifted using refraction of the optical unit.

An image display apparatus according to another aspect of the invention includes the optical device according to the aspect of the invention.

With this configuration, the image display apparatus with excellent display characteristics is obtained.

In the image display apparatus according to the aspect of the invention, it is preferable that the optical unit transmits the light, and a position of a pixel displayed through radiation of the light is shifted when the optical device spatially modulates the light.

With this configuration, it is possible to improve resolution simulatively.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an optical device and an image display apparatus according to the invention will be described in detail with reference to the appended drawings according to embodiments.

First Embodiment

Figure 1:
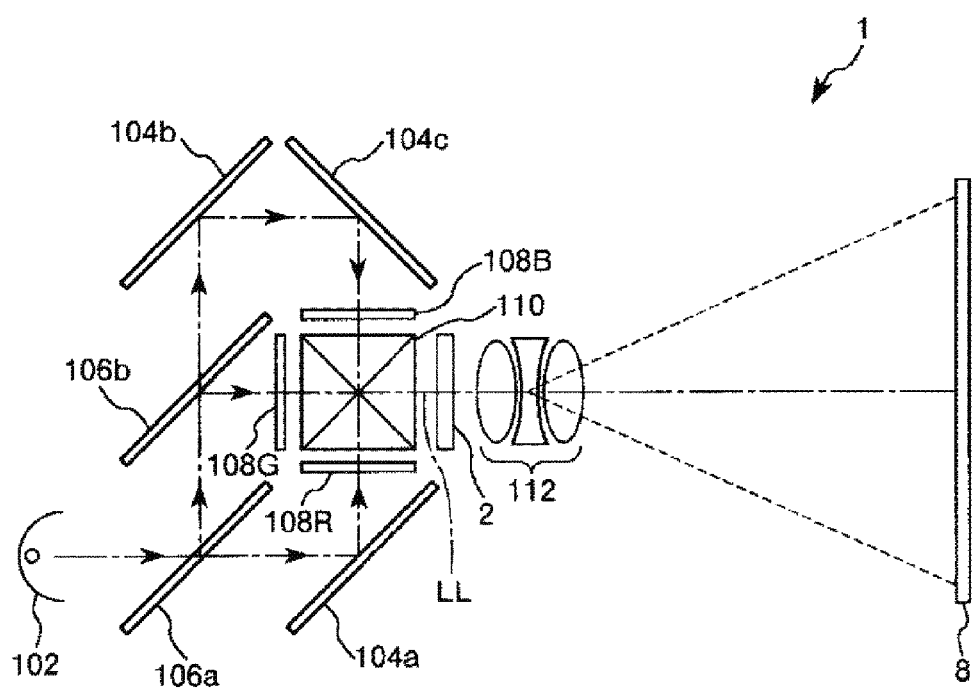
FIG. 1 is a diagram illustrating an optical configuration of an image display apparatus according to a first embodiment of the invention.
Figure 2:
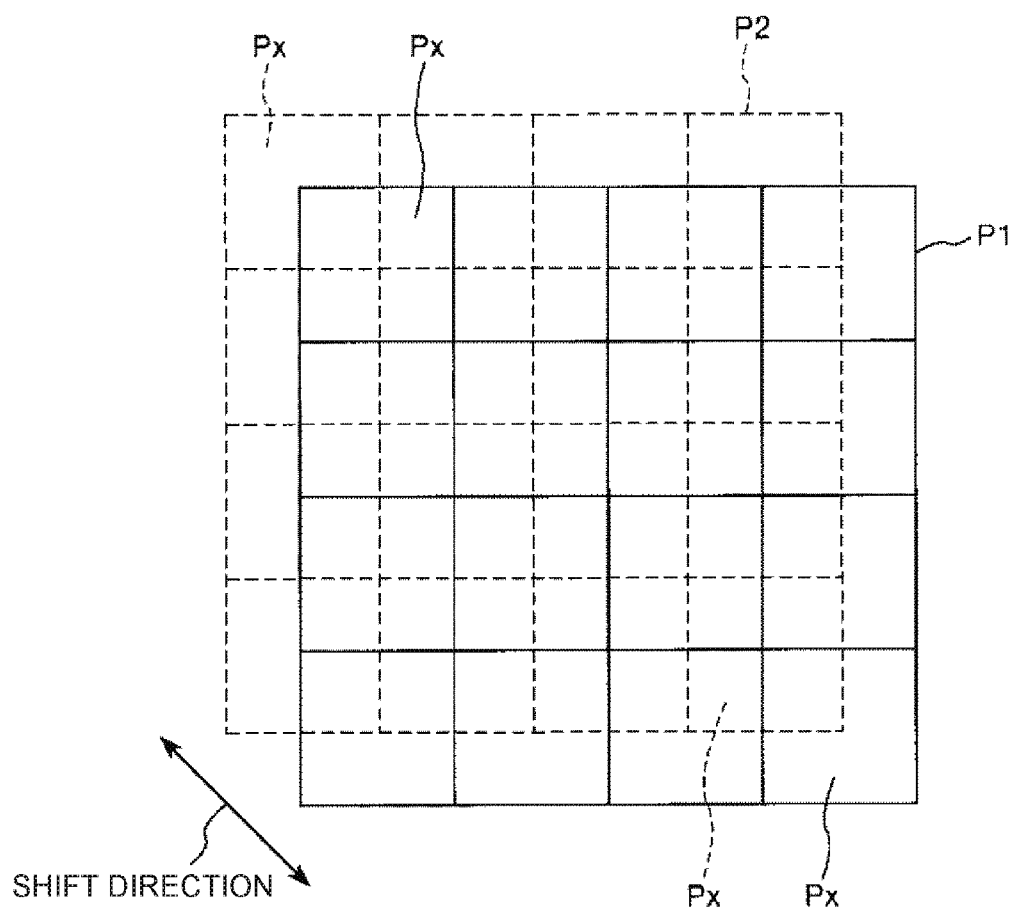
FIG. 2 is a diagram illustrating a shift form of video light.
Figure 3:
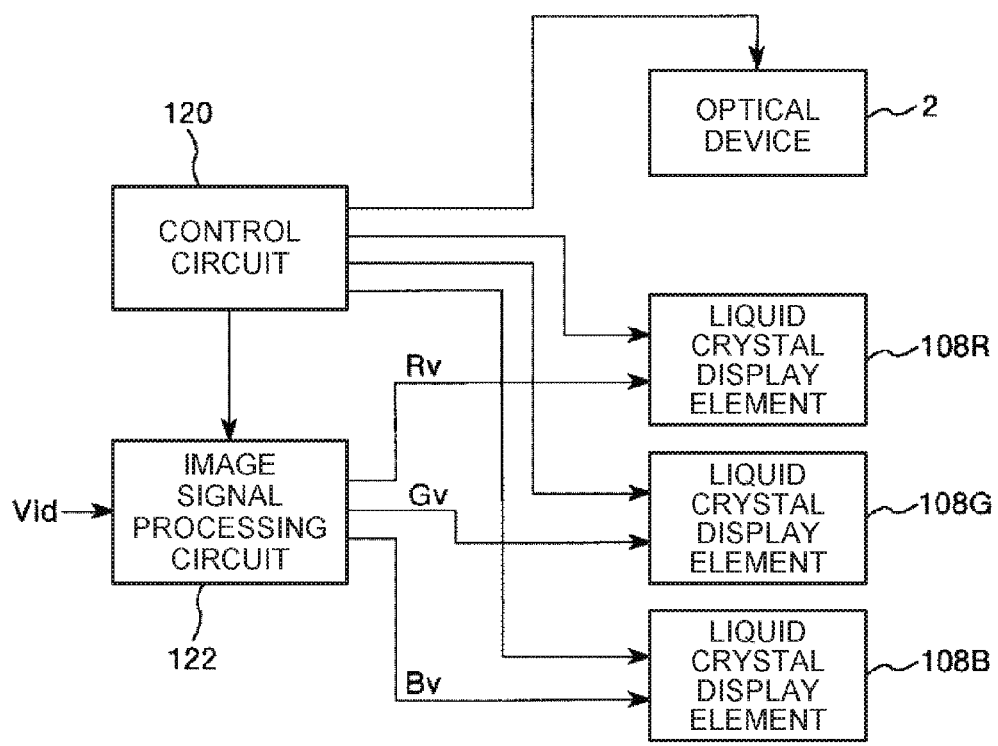
FIG. 3 is a block diagram illustrating an electric configuration of the image display apparatus illustrated in FIG. 1.
Figure 4:
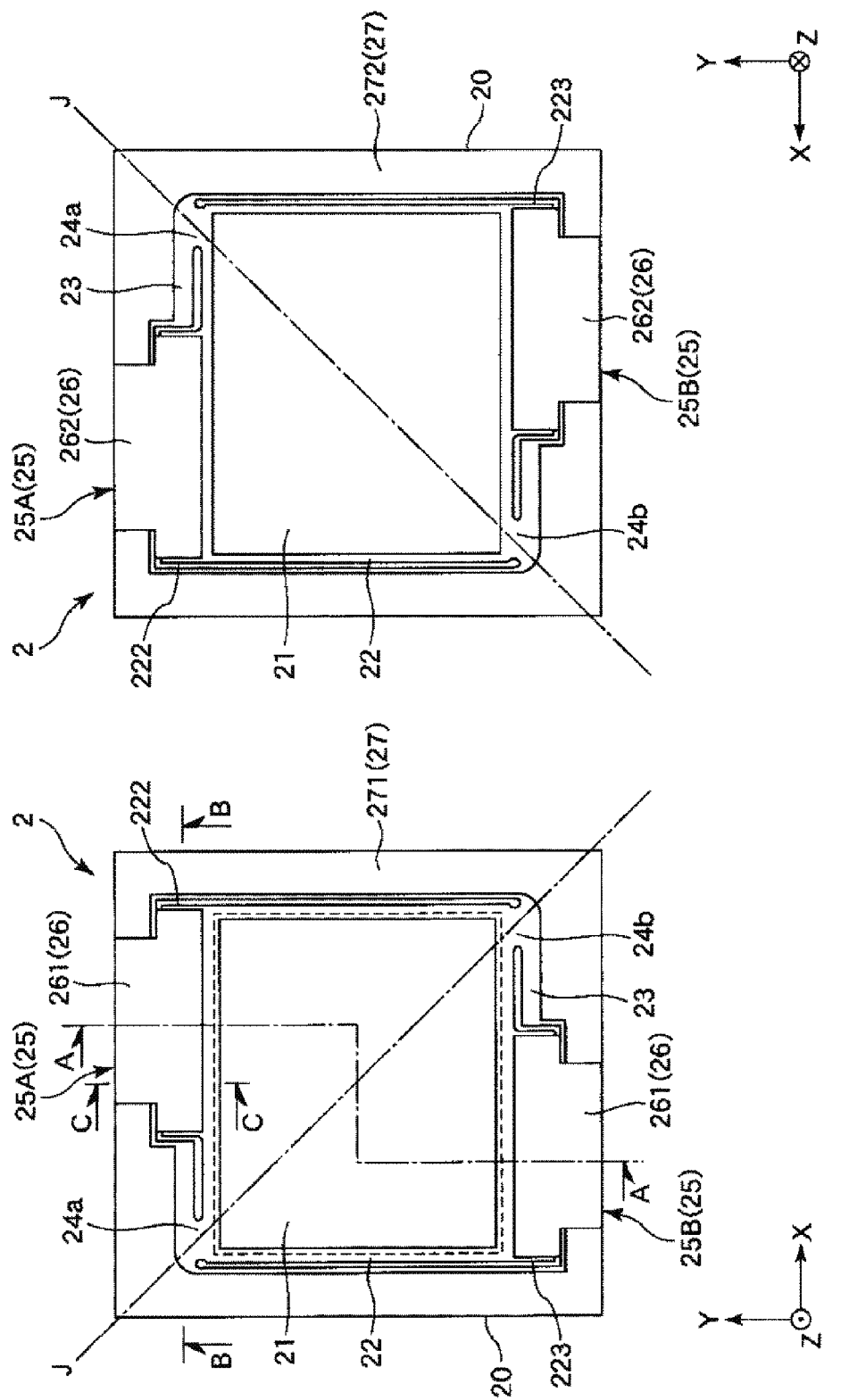
FIGS. 4A and 4B are top and bottom views illustrating an optical device included in the image display apparatus illustrated in FIG. 1.
Figure 5:
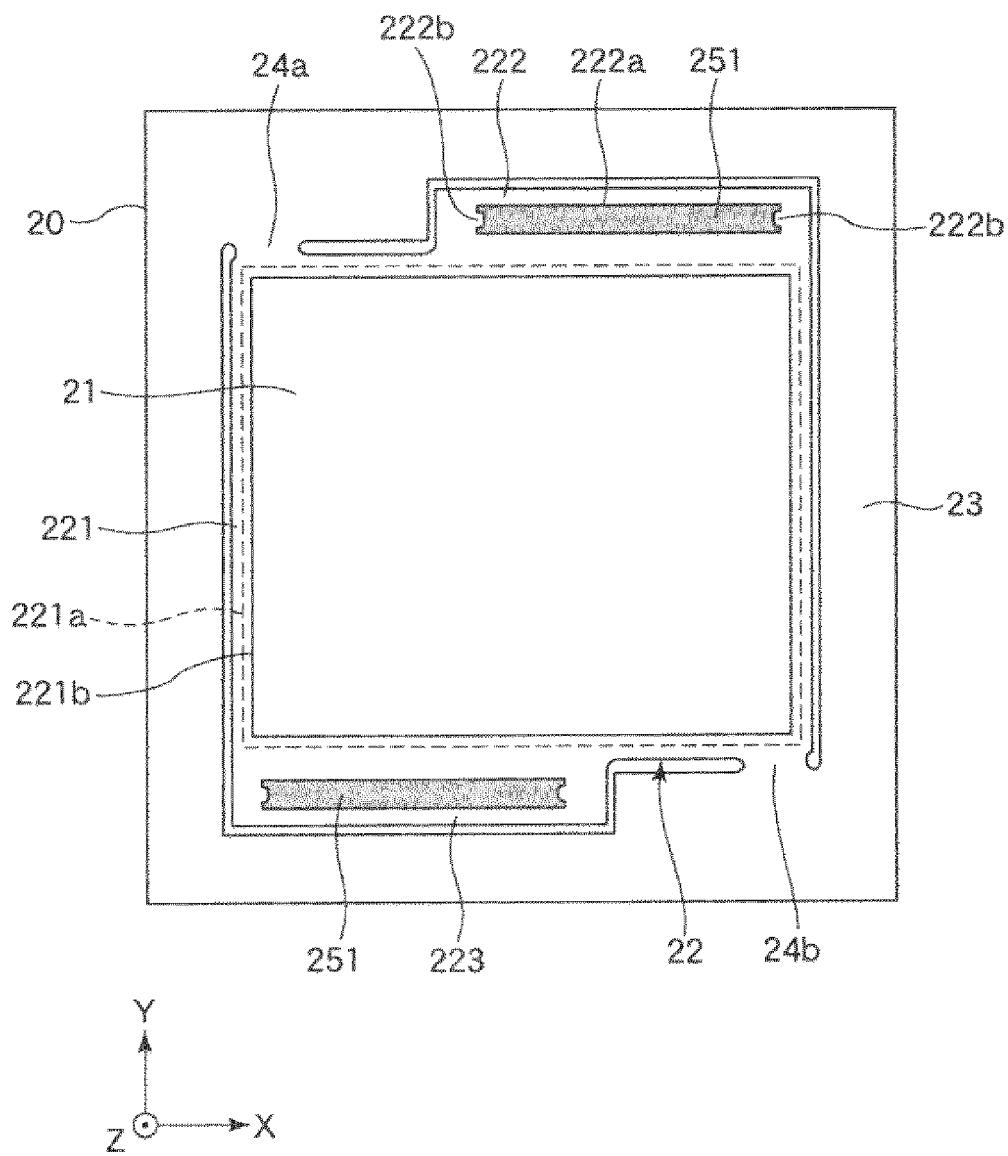
FIG. 5 is a top view illustrating a structure of the optical device illustrated in FIGS. 4A and 4B.
Figure 6:
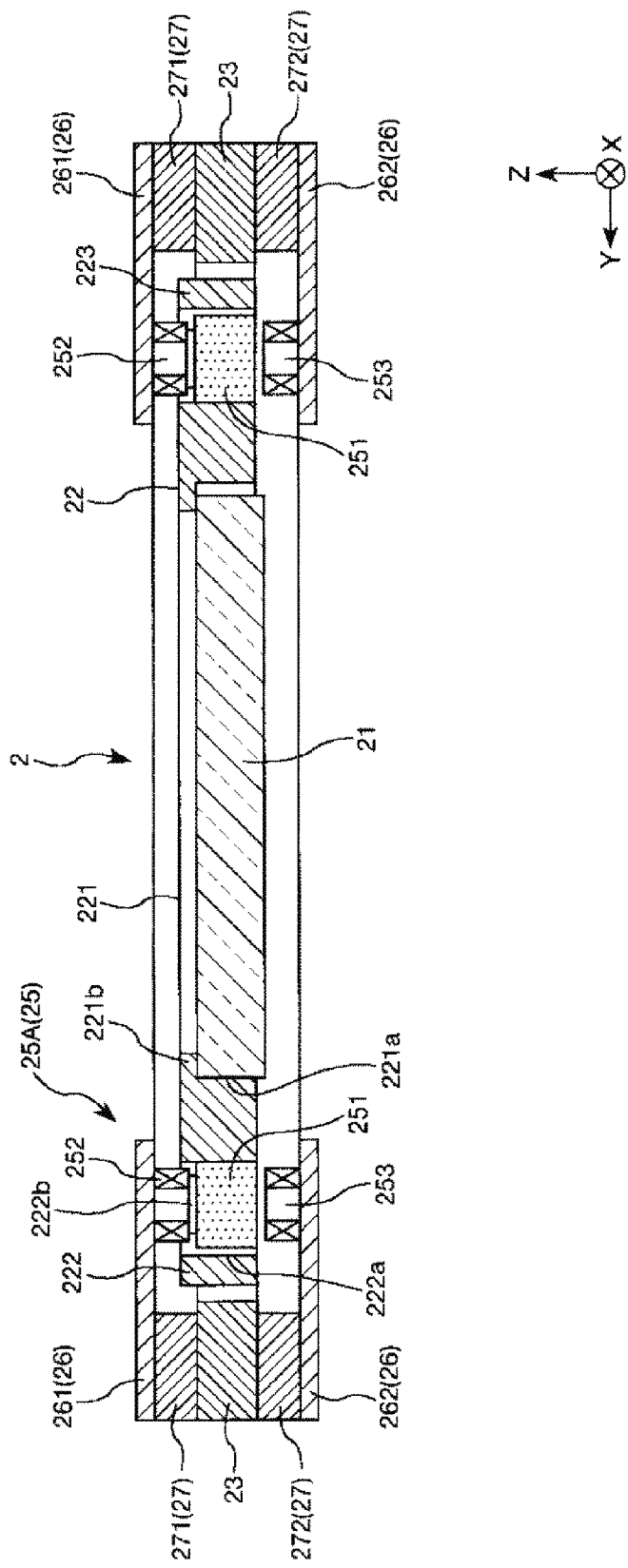
FIG. 6 is a sectional view taken along the line A-A of FIGS. 4A and 4B.
Figure 7:
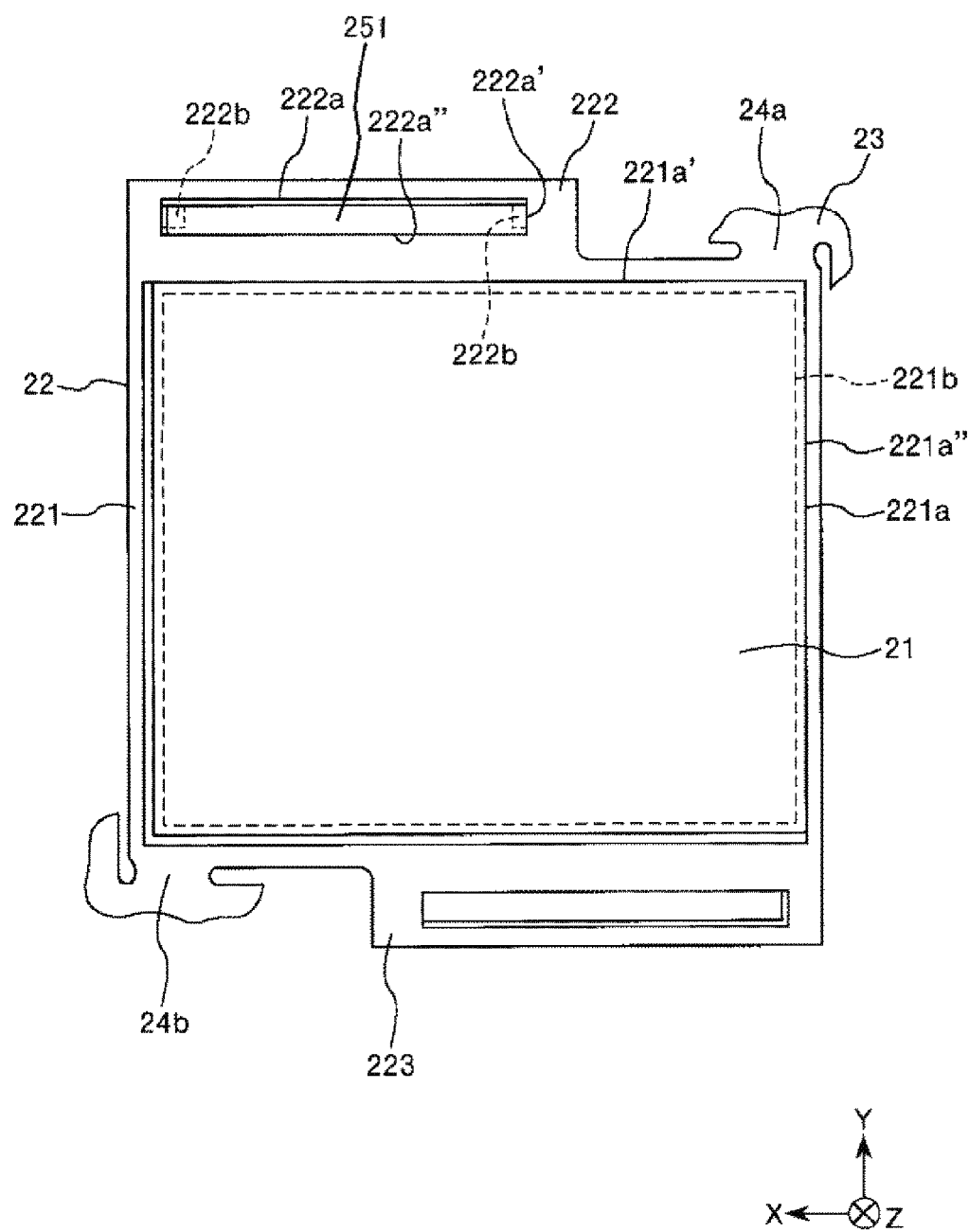
FIG. 7 is a top view illustrating a movable unit of the optical device illustrated in FIGS. 4A and 4B.
Figure 8A:
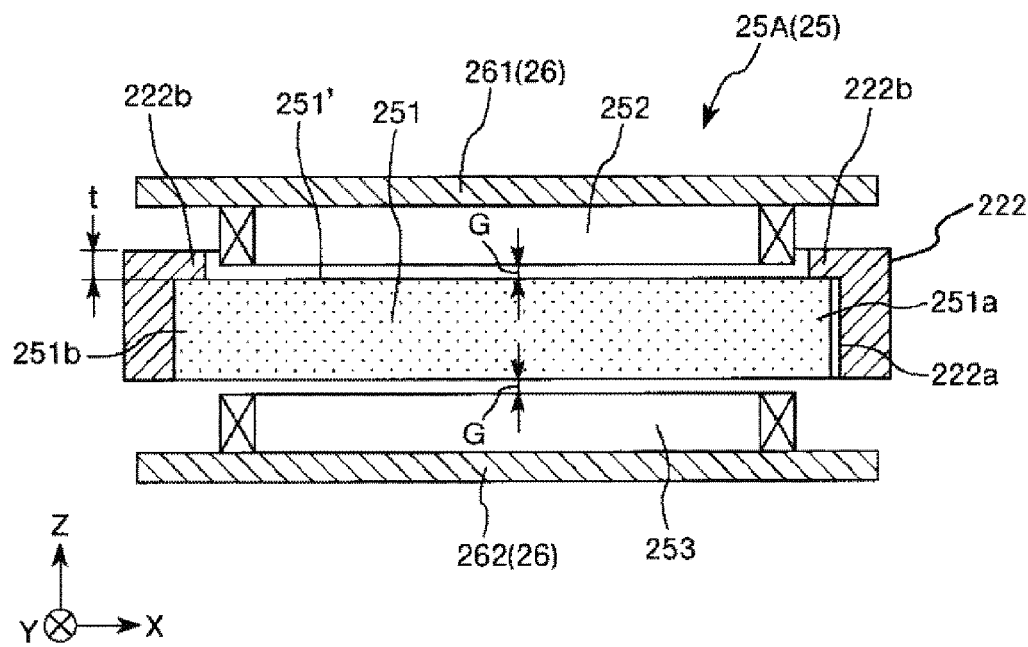
FIGS. 8A and 8B are sectional views taken along the line B-B and the line C-C of FIGS. 4A and 4B.
Figure 8B:
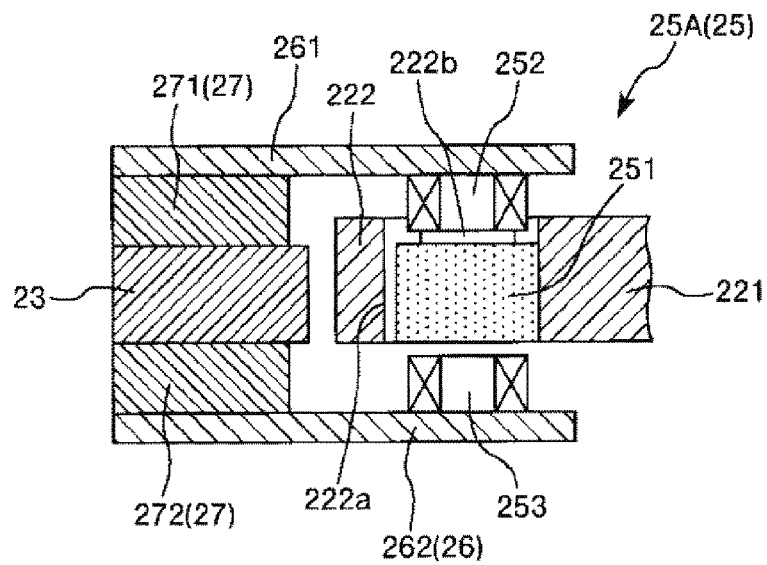

FIG. 1 is a diagram illustrating an optical configuration of an image display apparatus according to a first embodiment of the invention. FIG. 2 is a diagram illustrating a shift form of video light. FIG. 3 is a block diagram illustrating an electric configuration of the image displaying apparatus illustrated in FIG. 1. FIGS. 4A and 4B are top and bottom views illustrating an optical device included in the image display apparatus illustrated in FIG. 1. FIG. 5 is a top view illustrating a structure of the optical device illustrated in FIGS. 4A and 4B. FIG. 6 is a sectional view taken along the line A-A of FIGS. 4A and 4B. FIG. 7 is a top view illustrating a movable unit of the optical device illustrated in FIGS. 4A and 4B. FIGS. 8A and 8B are sectional views taken along the line B-B and the line C-C of FIGS. 4A and 4B. To facilitate the description in FIGS. 4A and 4B and FIGS. 8A and 8B, X, Y, and Z axes are illustrated as three axes that are orthogonal to each other. Hereinafter, a direction parallel to the X axis is referred to as "X axis direction", a direction parallel to the Y axis is referred to as a "Y axis direction", a direction parallel to the Z axis is referred to as a "Z axis direction, the +Z axis side is referred to as an "upper side", and the −Z axis side is referred to as a "lower side".

Projector

A projector (image display apparatus) 1 illustrated in FIG. 1 is an LCD projector. As illustrated in FIG. 1, the projector 1 includes a light source 102, mirrors 104a, 104b, and 104c, dichroic mirrors 106a and 106b, liquid crystal display elements 108R, 108G, and 108B, a dichroic prism 110, an optical device 2 serving as a light path deflection element, and a projection lens system 112.

Examples of the light source 102 include a halogen lamp, a mercury lamp, and a light-emitting diode (LED). A light source emitting white light is used as the light source 102. The light emitted from the light source 102 is first separated into red light (R) and other light by the dichroic mirror 106a. After the red light is reflected by the mirror 104a, the red light is incident on the liquid crystal display element 108R. The other light is further separated into green light (G) and blue light (B) by the dichroic mirror 106b. After the green light is incident on the liquid crystal display element 108G and the blue light is reflected by the mirrors 104b and 104c, the blue light is incident on the liquid crystal display element 108B.

The liquid crystal display elements 108R, 108G, and 108B are used as spatial light modulators. The liquid crystal display elements 108R, 108G, and 108B are transmission type spatial light modulators corresponding to the primary colors of R, G, and B and have pixels arranged in a matrix form of, for example, 1080 rows and 1920 columns. In each pixel, the amount of transmitted light of incident light is adjusted. A light amount distribution of all the pixels in each of the liquid crystal display elements 108R, 108G, and 108B are controlled cooperatively. The light spatially modulated by the liquid crystal display elements 108R, 108G, and 108B is combined by the dichroic prism 110, and thus full-color video light LL from the dichroic prism 110 is exited. Then, the exited video light LL is enlarged by the projection lens system 112 to be projected to a screen 8.

Here, the projector 1 includes the optical device 2 between the dichroic prism 110 and the projection lens system 112 and is configured to project an image with a resolution (4 K when the liquid crystal elements 108R, 108G, and 108B have full high-definitions) higher than the resolutions of the liquid crystal display elements 108R, 108G, and 108B to the screen 8 by shifting the light axis of the video light LL by the optical device 2 (performing so-called "pixel shift"). This principle will be described in brief with reference to FIG. 2. As will be described below, the optical device 2 includes a glass plate 21 through which the video light LL is transmitted (see FIGS. 4A and 4B), and thus can shift the light axis of the video light LL using refraction by changing the posture of the glass plate 21.

In the projector 1, an image display position P1 in a case of shift of the light axis of the video light LL to one side and an image display position P2 using the shift of the light axis in a case of shift of the light axis of the video light LL to the other side are configured to be deviated by half of a pixel (that is, half of a pixel Px) in an inclination direction (an arrow direction in FIG. 2) on the screen 8. When images are alternately displayed at the image display positions P1 and P2, the number of pixels apparently increases. Thus, the high resolution of the image projected to the screen 8 can be achieved. The shift amount of the image display positions P1 and P2 is not limited to half of a pixel. For example, the shift amount may be ¼ or ¾ of the pixel Px.

The projector 1 with such a configuration further includes a control circuit 120 and an image signal processing circuit 122 in addition to the optical device 2 and the liquid crystal display elements 108R, 108G, and 108B, as illustrated in FIG. 3. The control circuit 120 controls, for example, an operation of writing data signals on the liquid crystal elements 108R, 108G, and 108B, a light path deflection operation of the optical device 2, an operation of generating a data signal in the image signal processing circuit 122. On the other hand, the image signal processing circuit 122 separates an image signal Vid supplied from an external apparatus (not illustrated) into the three primary colors of R, G, and B and converts the image signal into data signals Rv, Gv, and Bv respectively appropriate for operations of the liquid crystal display elements 108R, 108G, and 108B. The converted data signals Rv, Gv, and By are supplied to the liquid crystal display elements 108R, 108G, and 108B, respectively, so that the liquid crystal display elements 108R, 108G, and 108B operate based on the data signals Rv, Gv, and Bv.

Optical Device

Next, the optical device 2 embedded in the above-described projector 1 will be described in detail.

As illustrated in FIGS. 4A and 4B, the optical device 2 includes a movable unit 22 that includes the glass plate (optical unit) 21 having optical transparency and deflecting the video light LL, a support unit 23 that has a frame shape provided around the movable unit 22, a structure 20 that includes axis portions 24*a* and 24*b* connecting the movable unit 22 to the support unit 23 and supporting the movable unit 22 to be swingable (rotatable) about a swing axis J with respect to the support unit 23, a reinforcement unit 27 that reinforces the structure 20, a driving mechanism 25 that swings the movable unit 22 with respect to the support unit 23, and a hold unit 26 that holds coils 252 and 253 included in the driving mechanism 25. The optical device 2 with such a configuration is disposed inside the projector 1 so that the −Z side is oriented toward the side of the dichroic prism 110 and the +Z side is oriented toward the side of the projection lens system 112. However, the direction of the optical device 2 may be reversed.

As illustrated in FIG. 5, the movable unit 22 has a flat plate shape and includes a glass plate support unit 221 that supports the glass plate 21 and permanent magnet support units 222 and 223 that are provided outside the glass plate support unit 221 and support permanent magnets 251 included in the driving mechanism 25.

As illustrated in FIG. 6, the glass plate support unit 221 includes a through hole 221*a* in the middle thereof. The glass plate support unit 221 includes a protrusion portion (claw portion) 221*b* protruding inside the through hole 221*a* on the +Z axis side from the end of the through hole 221*a*. The glass plate 21 is inserted into the through hole 221*a* to be caught by the protrusion portion 221*b*. Thus, the glass plate 21 is attached (fixed) to the glass plate support unit 221 by an adhesive or the like (not illustrated). In such a configuration, the glass plate 21 can be positioned in an XY in-plane direction with respect to the glass plate support unit 221 by the through hole 221*a*, and thus the glass plate 21 can be positioned in the Z axis direction with respect to the glass plate support unit 221 by the protrusion portion 221*b*. Accordingly, the glass plate 21 can be positioned with respect to the glass plate support unit 221 with higher precision.

Here, as illustrated in FIG. 7, the through hole 221*a* has an outer shape slightly larger than the glass plate 21 in a plan view (a plan view when viewed in the Z axis direction). The glass plate 21 is positioned so that the glass plate 21 is abutted on two sides 221*a*' and 221*a*" of the through hole 221*a* extending in different directions. In this way, by causing the through hole 221*a* to be larger than the glass plate 21 and positioning the glass plate 21 to be abutted on the sides 221*a*' and 221*a*", it is possible to position the glass plate 21 with respect to the glass plate support unit 221 with higher precision while easily inserting the glass plate 21 into the through hole 221*a*. The thermal expansion coefficients of the glass plate support unit 221 and the glass plate 21 are different from each other. Therefore, by providing a gap between the outer circumference of the glass plate 21 and the inner circumference of the through hole 221*a*, it is possible to reduce deformation (particularly, bending or warping) of the glass plate 21 and the glass plate support unit 221 due to thermal stress.

The glass plate 21 supported by the glass plate support unit has a rectangular shape in a plan view. One main surface of the glass plate 21 (a surface of the glass plate 21 in the plan view) configures a light incident portion on which light is incident and the other main surface configures a light exit surface from which the light exits. The glass plate 21 can transmit the incident video light LL to be refracted by inclining an incident angle of the video light LL from 0°. Accordingly, by changing the posture of the glass plate 21 so that a targeting incident angle is obtained, it is possible to control a deflection direction or a deflection amount of the video light LL. The size of the glass plate 21 is appropriately set so that the video light LL exited from the dichroic prism 110 can be transmitted. The glass plate 21 is preferably substantially colorless and transparent. Anti-reflection films may be formed on the incident surface and the exit surface of the glass plate 21 on which and from which the video light LL is incident and exited.

A material of which the glass plate 21 is formed is not particularly limited. For example, any of various glass materials such as white plate glass, borocilicate glass, and quartz glass can be used. In the embodiment, the glass plate is used as an optical unit. The optical unit is not particularly limited as long as the optical unit is formed of a material which has optical transparency and is capable of refracting the video light LL. The optical unit may be formed of not only glass but also, for example, any of various crystalline materials such as crystal quartz and sapphire or any of various resin materials such as polycarbonate-based resin and an acrylic-based resin. However, it is preferable to use the glass plate 21 as the optical unit as in the embodiment. Accordingly, since rigidity of the optical unit can be particularly increased, deflection irregularity of the video light LL deflected in the optical unit can be particularly suppressed. The planar shape of the glass plate 21 is not limited to the rectangle, but can have any of various shapes as long as the deflection direction or the deflection amount of the video light LL can be controlled.

The permanent magnet support units 222 and 223 are connected to the outer circumference of the glass plate support unit 221 by which the glass plate 21 is supported. The permanent magnet support units 222 and 223 are located to be opposite to each other with respect to the swing axis J. The permanent magnet support units 222 and 223 have the mutually same configuration. Therefore, the permanent magnet support unit 222 will be described as a representative below and the permanent magnet support unit 223 will not be described.

As illustrated in FIGS. 5 and 6, the permanent magnet support unit 222 includes a through hole 222*a* that is penetrated through the permanent magnet support unit 222 in the thickness direction (Z axis direction) and a protrusion portion 222b that protrudes inside the through hole 222a on the +Z axis side from the end of the through hole 222a. The permanent magnet 251 is inserted into the through hole 222a to be caught by the protrusion portion 222b. The inserted permanent magnet 251 is attached (fixed) to the permanent magnet support unit 222 by an adhesive or the like (not illustrated). In other words, the frame 222a (through hole) into which the permanent magnet 251 is inserted is formed in the permanent magnet support unit 222. The permanent magnet 251 inserted into the frame 222a is supported by the protrusion portion 222b protruding to the inside of the frame 222a. In such a configuration, the permanent magnet 251 can be positioned in the XY in-plane direction with respect to the permanent magnet support unit 222 by the through hole 222a, and thus the permanent magnet 251 can be positioned in the Z axis direction with respect to the permanent magnet support unit 222 by the protrusion portion 222b. Accordingly, the permanent magnet 251 can be positioned with respect to the permanent magnet support unit 222 with higher precision. Thus, the permanent magnet 251 and the coils 252 and 253 can be positioned with higher precision.

In particular, since the protrusion portion 222b is provided on the same side as the protrusion portion 221b, an insertion direction of the permanent magnet 251 into the through hole 222a can be aligned with an insertion direction of the glass plate 21 into the through hole 221a. Therefore, the glass plate 21 and the permanent magnet 251 can be inserted more simply.

Here, as illustrated in FIG. 7, the through hole 222a has an outer rectangular shape slightly larger than the permanent magnet 251 in the plan view (the plan view when viewed in the Z axis direction). The permanent magnet 251 is positioned so that the permanent magnet 251 is abutted on two sides 222a' and 222a" of the through hole 222a extending in different directions. In this way, by causing the through hole 222a to be larger than the permanent magnet 251 and positioning the permanent magnet 251 to be abutted on the sides 222a' and 222a", it is possible to position the permanent magnet 251 with respect to the permanent magnet support unit 222 with higher precision while easily inserting the permanent magnet 251 into the through hole 222a. The thermal expansion coefficients of the permanent magnet support unit 222 and the permanent magnet 251 are different from each other. Therefore, by providing a gap between the outer circumference of the permanent magnet 251 and the inner circumference of the through hole 222a, it is possible to reduce deformation (particularly, bending or warping) of the permanent magnet 251 and the permanent magnet support unit 222 due to thermal stress.

In particular, in the embodiment, since the permanent magnet 251 is disposed to be abutted on the sides 222a' and 222a' located on the center side of the movable unit 22, the permanent magnet 251 can be disposed to be closer to the center of the movable unit 22. Therefore, moment of inertia of the movable unit 22 is reduced, and thus the movable unit 22 can be swung more smoothly.

The support unit 23 with a frame shape is provided around the movable unit 22 with such a configuration, and the movable unit 22 and the support unit 23 are connected by the axis portions 24a and 24b. The axis portions 24a and 24b are located to be deviated in the X axis direction and the Y axis direction in the plan view. Accordingly, the swing axis J inclined at about 45° with respect to both X and Y axes is formed. The movable unit 22 is swung about the swing axis J, and thus the posture of the glass plate 21 is changed with the swinging. In particular, in the optical device 2, the axis portions 24a and 24b are disposed to be point-symmetric centering on the glass plate 21 in the plan view. Therefore, swinging balance of the movable unit 22 is good. The inclination angle of the swing axis J with respect to the X axis (the Y axis) is not limited to 45°.

The above-described structure 20 (the movable unit 22, the support unit 23, and the axis portions 24a and 24b) is integrally configured. Accordingly, shock resistance or long-term durability can be increased in boundaries of the support unit 23 and the axis portions 24a and 24b or boundaries of the axis portions 24a and 24b and the movable unit 22.

The structure 20 (the movable unit 22, the support unit 23, and the axis portions 24a and 24b) is formed of a material with the lower Young's modulus than the material of which the glass plate 21. As such a material, a material containing a resin is preferable and a material having a resin as a main component is more preferable. Accordingly, it is possible to prevent stress occurring with the swinging the movable unit 22 from being connected to unnecessary vibration of the glass plate 21 itself. The flexible movable unit 22 surrounds the side surfaces of the glass plate 21. Therefore, when the posture of the glass plate 21 is changed, stress occurring in the glass plate 21 can be suppressed small, and thus unnecessary vibration occurring in the glass plate 21 with a stress distribution can be suppressed small. As a result, it is possible to prevent an image deflected by the glass plate 21 from being deflected in an unintended direction. Further, it is possible to suppress a change in the swing trajectory of the movable unit 22 to an ambient temperature. For example, the axis portions 24a and 24b and the peripheries of the axis portions 24a and 24b can be sufficiently flexible, and thus the miniature optical device 2 with a low resonance frequency (about 130 kHz to about 170 kHz) can be realized.

The resin is not particularly limited. Example of the resin include polyethylene, polypropylene, silicone, polyacetal, polyamide, polycarbonate, polyphenylene ether, polyethylene telephthalate, polybutylene terephthalate, polyarylate, polysulphone, polyethersulfone, polyphenylenesulfide, polyether ether ketone, polyimide, polyetherimide, and fluororesin. A material containing at least one of these resins is used.

The reinforcement unit 27 is provided in order to reinforce the above-described structure 20. As illustrated in FIGS. 4A and 4B, the reinforcement unit 27 includes a first reinforcement unit 271 that has a frame shape joined to the main surface of the support unit 23 of the structure 20 on the +Z axis side and a second reinforcement unit 272 that has a frame shape joined to the main surface of the support unit 23 on the −Z axis side. The support unit 23 is interposed between the first reinforcement unit 271 and the second reinforcement unit 272 so that the support unit 23 is reinforced. Therefore, the bending (deforming) of the support unit 23 at the time of swinging of the movable unit 22 is reduced, and thus the movable unit 22 can be swung more stably.

The reinforcement unit 27 (the first and second reinforcement units 271 and 272) is preferably formed of a metal material such as aluminum, titanium, partial stainless steel. Accordingly, since the reinforcement unit 27 can be thinned and hardened, the thinness of the optical device 2 can be achieved and the support unit 23 can be reinforced more strongly.

A method of joining the first reinforcement unit 271 and the second reinforcement unit 272 to the support unit 23 is not particularly limited. Any of various adhesives such as an epoxy-based adhesive, an acrylic-based adhesive, and a silicone-based adhesive is preferably used. Accordingly, a relatively flexible adhesive layer is formed between the first reinforcement unit 271 and the second reinforcement unit 272, and the support unit 23, stress to be applied to the support unit 23 is eased by the adhesive layer, and thus the movable unit 22 can be swung further more stably. However, in a case in which the support unit 23 has sufficient rigidity even when the reinforcement unit 27 is not provided, the reinforcement unit 27 may be omitted.

Next, the driving mechanism 25 swinging the movable unit 22 will be described. As illustrated in FIGS. 4A and 4B, the driving mechanism 25 includes a first driving mechanism 25A that is disposed to correspond to the permanent magnet support unit 222 and a second driving mechanism 25B that is disposed to correspond to the permanent magnet support unit 223. The first driving mechanism 25A and the second driving mechanism 25B have the mutually same configuration. Therefore, the first driving mechanism 25A will be described below as a representative and the second driving mechanism 25B will not be described.

As illustrated in FIG. 8A, the first driving mechanism 25A is an electromagnetic actuator that includes the permanent magnet 251 interposed into the through hole 222a of the permanent magnet support unit 222 and one pair of coils 252 and 253 generating a magnetic field applied to the permanent magnet 251. One pair of coils 252 and 253 are disposed to interpose the permanent magnet 251. Specifically, the coil 252 is disposed to face the permanent magnet 251 on the −Z axis side of the permanent magnet 251 and the coil 253 is disposed to face the permanent magnet 251 on the +Z axis side of the permanent magnet 251. In other words, the coils 252 and 253 are disposed to overlap the permanent magnet 251 when the coil 252 or 253 is viewed in a direction in which the magnetic core is inserted (in the case of the air-core coils, the coils are viewed in a ring state). In this way, by using the electromagnetic actuator as the driving mechanism 25, a force sufficient to swing the movable unit 22 can be generated with the simple configuration, and thus the movable unit 22 can be swung smoothly.

The permanent magnet 251 is formed in a rectangular shape in the X axis direction and is magnetized in the Z axis direction (the thickness direction of the glass plate 21). In this way, by extending the permanent magnet 251 in the X axis direction (that is, a direction orthogonal (intersecting) to the Y axis direction which is an arrangement direction of the glass plate 21 and the permanent magnet 251), the permanent magnet 251 can be disposed toward the center (the swing axis J) of the movable unit 22, and thus the moment of inertia of the movable unit 22 can be reduced. Therefore, the movable unit 22 can be swung smoothly.

The permanent magnet 251 is not particularly limited. For example, a neodymium magnet, a ferrite magnet, a samarium-cobalt magnet, or an alnico magnet can be used.

On the other hand, the coils 252 and 253 are disposed to face each other via the permanent magnet 251. In other words, the permanent magnet 251 is interposed between the coils 252 and 253. More specifically, the coil 252 is disposed on the +Z axis side of the permanent magnet 251 and the coil 253 is disposed on the −Z axis side. The coils 252 and 253 are provided to extend in the X axis direction to correspond to the permanent magnet 251. The coils 252 and 253 are each disposed to be separate from the permanent magnet 251. In this way, by providing the one pair of coils 252 and 253 to interpose the permanent magnet 251, a magnetic field to be applied to the permanent magnet 251 from both sides of the permanent magnet 251 can be generated. Therefore, the movable unit 22 can be swung more smoothly.

Separate distances (gaps G) between the coils 252 and 253 and the permanent magnet 251 are not particularly limited, but are different in accordance with the size of the movable unit 22, the magnitude of the magnetic field generated from the coils 252 and 253, or the like. For example, the gap G is preferably in the range equal to or greater than 0.1 mm and equal to or less than 0.5 mm and is more preferably in the range equal to or greater than 0.2 mm and equal to or less than 0.4 mm. Accordingly, while preventing the permanent magnet 251 from coming into contact with the coils 252 and 253 at the time of swinging of the movable unit 22, it is possible to more efficiently apply the magnetic field generated from the coils 252 and 253 to the permanent magnet 251. Therefore, the movable unit 22 can be swung more efficiently and stably.

The coils 252 and 253 are air-core coils. By configuring the coils 252 and 253 as the air-core coils, it is possible to swing the movable unit 22 more smoothly. More specifically, for example, in a case in which coils having magnetic cores inside are used as the coils 252 and 253, the permanent magnet 251 is attracted to the magnetic cores depending on the intensity of the generated magnetic force. Thus, the swing axis J may be displaced and the movable unit 22 may not be swung smoothly in some cases. To prevent occurrence of such a problem, it is preferable to use the air-core coils as the coils 252 and 253 as in the embodiment.

In the above-described driving mechanism 25, the magnetic field is generated from the coils 252 and 253 by applying driving signals to the coils 252 and 253 from a voltage application unit (not illustrated). The movable unit 22 is swung (rotated) about the swing axis J with respect to the support unit 23 by applying the generated magnetic field to the permanent magnet 251. The light axis of the video light LL is shifted through the swinging of the movable unit 22 and images are alternately displayed at the image display positions P1 and P2. Accordingly, the number of pixels apparently increases, and thus the high resolution of the image can be achieved.

The configuration of the driving mechanism 25 is not particularly limited as long as the movable unit 22 can be swung. For example, the second driving mechanism 25B may be omitted and only the first driving mechanism 25A may be configured. The second driving mechanism 25B may be omitted and any one of the coils 252 and 253 may be omitted from the first driving mechanism 25A.

The coils 252 and 253 are held in the hold unit 26 and are fixed to the structure 20. Specifically, as illustrated in FIG. 8B, the hold unit 26 includes a first hold unit 261 that is located on the +Z axis side with respect to the support unit 23, holds the coil 252, and is fixed to the support unit 23 via the first reinforcement unit 271 and a second hold unit 262 that is located on the −Z axis side with respect to the support unit 23, holds the coil 253, and is fixed to the support unit 23 via the second reinforcement unit 272. The first reinforcement unit 271 and the second reinforcement unit 272 function to reinforce the support unit 23, as described above, and function as gap layers for forming the gaps G between the permanent magnet 251 and the coils 251 and 252.

In this way, when the coils 252 and 253 are configured to be fixed to the support unit 23 via the first hold unit 261 and the second hold unit 262, the positions of the coils 252 and 253 with respect to the permanent magnet 251 can be easily adjusted, for example, by adjusting the fixed positions of the first hold unit 261 and the second hold unit 262 with respect to the support unit 23. Therefore, the permanent magnet 251 and the coils 252 and 253 can be easily positioned. A method of connecting the first hold unit 261 and the second hold unit 262 to the reinforcement unit 27 (the support unit 23) is not particularly limited. For example, an adhesive, a fastening screw, or recession and projection fitting can be used.

The first hold unit 261 and the second hold unit 262 hold the coils 252 and 253 from the opposite side to the permanent magnet 251. That is, the first hold unit 261 and the second hold unit 262 are provided not to be located between the permanent magnet 251 and the coils 252 and 253. By disposing the first hold unit 261 and the second hold unit 262 in this way, it is possible to decrease the gaps G between the permanent magnet 251 and the coils 252 and 253.

The hold unit 26 (the first hold unit 261 and the second hold unit 262) with such a configuration is a non-magnetic body. Accordingly, since formation of a magnetic path by the hold unit 26 is suppressed, the magnetic field generated by the coils 252 and 253 can be efficiently applied to the permanent magnet 251. A non-magnetic material of which the hold unit 26 is formed is not particularly limited. For example, a metal material such as aluminum, titanium, or a partial stainless steel or a resin material such as rubber or plastic can be used. Of the materials, a metal material such as aluminum or titanium is preferably used. Accordingly, since the hold unit 26 can be thinned and hardened, the thinness of the optical device 2 can be achieved and the support unit 23 can be reinforced more strongly. For example, the hold unit 26 may be integrated with the reinforcement unit 27.

The configuration of the optical device 2 has been described in brief above. Next, disposition of the permanent magnet 251 included in the optical device 2, the coils 252 and 253, and the through hole 222a and the protrusion portion 222b will be described in detail. Since the coils 252 and 253 are provided to be symmetric with respect to the permanent magnet 251, the coil 252 will be described as a representative below and the coil 253 will not be described.

As described above, the permanent magnet 251 and the coil 252 are provided to extend in the X axis direction. The length of the permanent magnet 251 in the X axis direction is greater than the length of the coil 252 in the X axis direction. The length of the permanent magnet 251 in the Y axis direction is greater than the length of the coil 252 in the Y axis direction. According to such a size relation, the through hole 222a into which the permanent magnet 251 is inserted is formed to be slightly greater than the coil 252 and is disposed to contain the coil 252 in the plan view when viewed in the Z axis direction. In such a configuration, as will be described below, the coil 252 can be inserted inside the through hole 222a, and thus the permanent magnet 251 and the coil 252 can be disposed to be closer to each other.

On the other hand, the protrusion portion 222b protruding inside the through hole 222a is provided to protrude inside the through hole 222a from both ends of the through hole 222a in the X axis direction and is disposed not to overlap the coil 252 in the plan view when viewed in the Z axis direction. In other words, the entire region of the protrusion portion 222b is located outside the coil 252. The protrusion portion 222b supports both ends 251a and 251b in the longitudinal direction of the permanent magnet 251 (that is, portions located outside the coil 252).

In this way, by causing the permanent magnet 251 to be longer than the coil 252 and causing the protrusion portion 222b to support the portions exceeding from the coil 252, it is possible to prevent the coil 252 and the protrusion portion 222b from coming into contact with each other. Therefore, the separate distance (the gap G) between the permanent magnet 251 and the coil 252 can be further decreased. In particular, in the embodiment, as FIGS. 8A and 8B, the gap G is less than a thickness (a length in the Z axis direction or a length in the arrangement direction of the permanent magnet 251 and the coil 252) t of the protrusion portion 222b. Accordingly, the gap G can be further decreased, and thus the magnetic field generated from the coil 252 can be efficiently applied to the permanent magnet 251. To balance the swinging, the separate distance between the permanent magnet 251 and the coil 252 can be preferably substantially the same as the separate distance between the permanent magnet 251 and the coil 253. However, as described above, by decreasing the separate distance between the permanent magnet 251 and the coil 252, the separate distance between the permanent magnet 251 and the coil 253 can also be decreased.

In the embodiment, as described above, the protrusion portion 222b supports a surface 251' of the permanent magnet 251 on the coil side. Therefore, for example, the position of the surface 251' of the permanent magnet 251 in the Z axis direction can be set at a predetermined position without an influence of irregularity of the size (thickness) of the permanent magnet 251, and thus the separate distance (the gap G) between the permanent magnet 251 and the coil 252 can be set as a desired distance.

The disposition of the permanent magnet 251, the coils 252 and 253, and the protrusion portion 222b supporting the permanent magnet 251 has been described in detail. Such a disposition is not limited to the embodiment. For example, the protrusion portion 222b may be provided to protrude inside the through hole 222a from both ends of the through hole 222a in the Y axis direction. However, in such a configuration, there is a concern of the permanent magnet 251 increasing compared to the embodiment. Therefore, the embodiment is better in that the size of the permanent magnet 251 can be suppressed.

Second Embodiment

Figure 9:
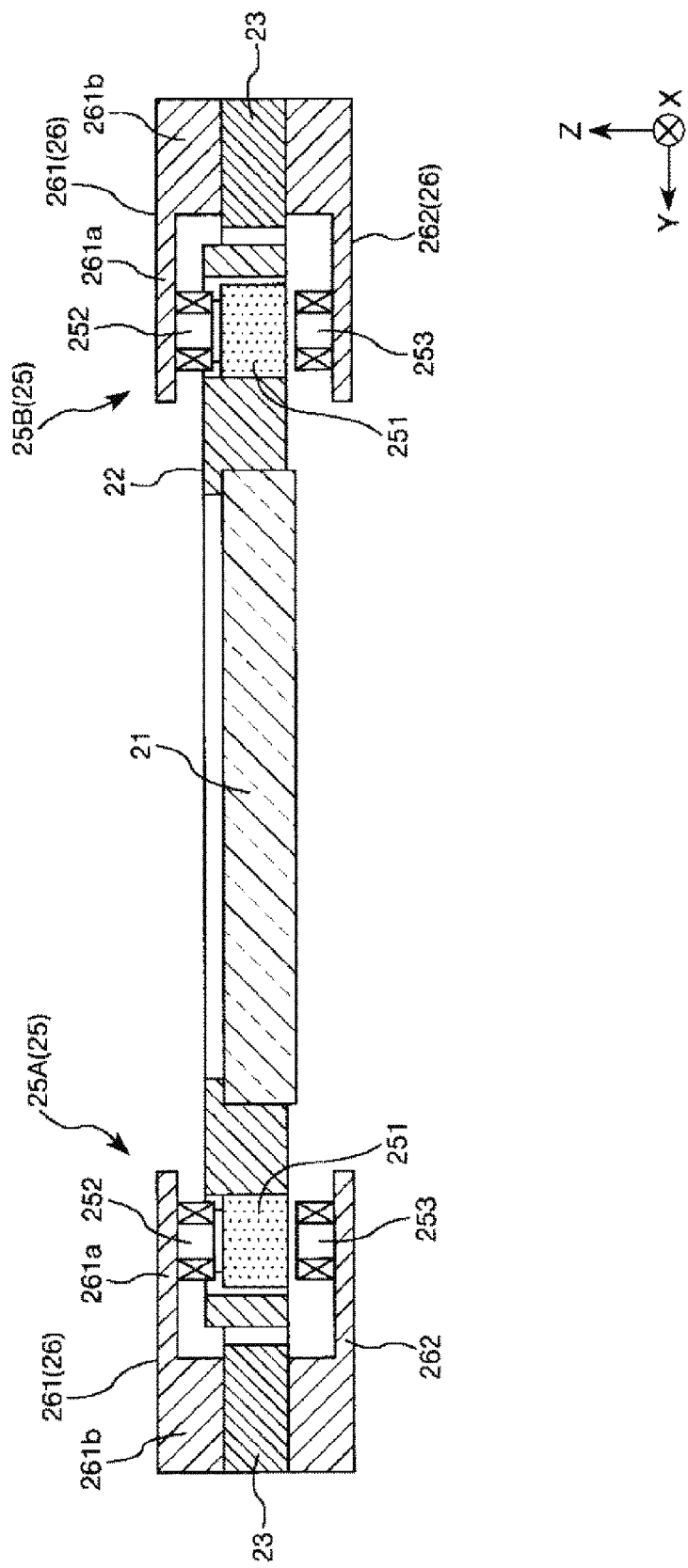
FIG. 9 is a sectional view illustrating an optical device included in an image display apparatus according to a second embodiment of the invention.

FIG. 9 is a sectional view illustrating an optical device included in an image display apparatus according to a second embodiment of the invention.

Hereinafter, the image display apparatus according to the second embodiment of the invention will be described. Differences from the above-described embodiment will be mainly described and the same points will not be described.

The image display apparatus according to the second embodiment is the same as that of the above-described first embodiment except that the configuration of an optical device is different. The same reference numerals are given to the same configurations as those of the above-described embodiment.

As illustrated in FIG. 9, the optical device 2 according to the embodiment is configured such that the reinforcement unit 27 is omitted compared to the above-described first embodiment. As described above, the reinforcement unit 27 (the first reinforcement unit 271 and the second reinforcement unit 272) also functions as a gap layer adjusting the separate distance (the gap G) between the permanent magnet 251 and the coil 252. Accordingly, in the embodiment, the first hold unit 261 holding the coil 252 is configured to include a thin portion 261a that supports the coil 252 and a thick portion 261b that is supported by the support unit 23 and has a thickness thicker than the thin portion 261a. The thick portion 261b is used as the foregoing gap layer. The same also applies to the second hold unit 262.

Even in the second embodiment, the same advantages as those of the above-described first embodiment can be obtained.

In the embodiment, by thickening parts of the first hold unit 261 and the second hold unit 262, the parts function as the gap layers. However, as a modification example, for example, by thickening the support unit 23 of the structure 20, the support unit 23 may function as a gap layer.

Third Embodiment

Figure 10:
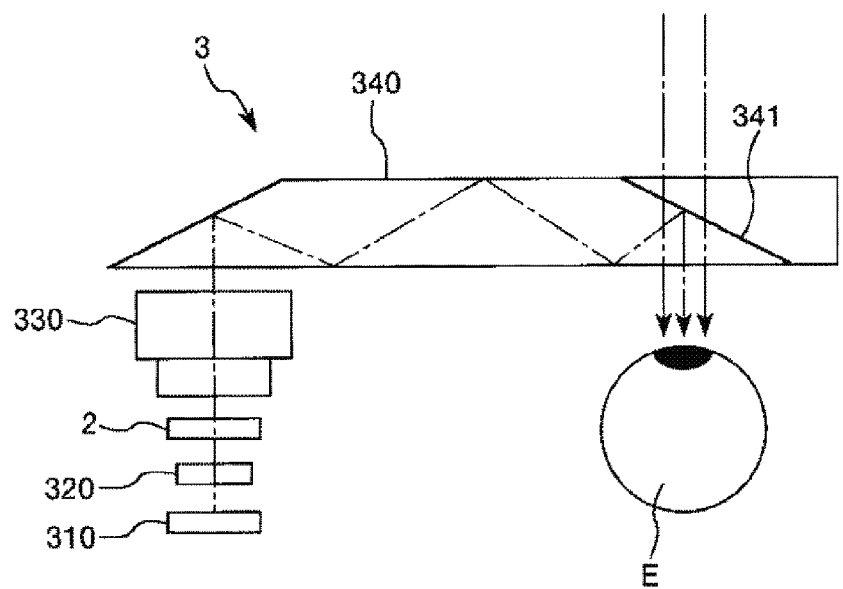
FIG. 10 is a diagram illustrating an optical configuration of an image display apparatus according to a third embodiment of the invention.

FIG. 10 is a diagram illustrating an optical configuration of an image display apparatus according to a third embodiment of the invention.

Hereinafter, the image display apparatus according to the third embodiment will be described. Differences from the above-described embodiment will be mainly described and the same points will not be described.

The image display apparatus according to the third embodiment is a semi-transmission type (see-through type) head-mounted display (hereinafter also simply referred to as an "HMD").

An HMD (image display apparatus) 3 according to the embodiment is mounted on an observer (user) for use. As illustrated in FIG. 10, the HMD 3 includes a light source 310, a liquid crystal display element 320, a projection lens system 330, a light-guiding unit 340, and the optical device 2 serving as a light path deflection element. The light source 310 is not particularly limited. For example, a backlight of an LED can be used. Light generated from the light source 310 is guided to the liquid crystal display element 320. The liquid crystal display element 320 is a transmission type liquid crystal display element. For example, a high-temperature poly silicon (HTPS) single plate TFT color liquid crystal panel can be used. The liquid crystal display element 320 modulates light from the light source 310 to generate video light. The generated video light is enlarged by the projection lens system, and then is incident on the light-guiding unit 340. The light-guiding unit 340 is formed in a plate shape and a half mirror 341 is disposed on a downstream side in a propagation direction of the light. The light guided inside the light-guiding unit 340 travels in a repeatedly reflected manner to be guided to a pupil E of the observer by the half mirror 341. Together with this light, outside light is transmitted through the half mirror 341 to be guide to the pupil E of the observer. Accordingly, in the HMD 3, the video light is superimposed on a landscape to be viewed.

In the HMD 3 with such a configuration, the optical device 2 is disposed between the liquid crystal display element 320 and the projection lens system 330. Accordingly, the light axis of the video light LL can be shifted.

Even in the above-described third embodiment, the same advantages as those of the above-described first embodiment can be obtained.

Fourth Embodiment

Figure 11:
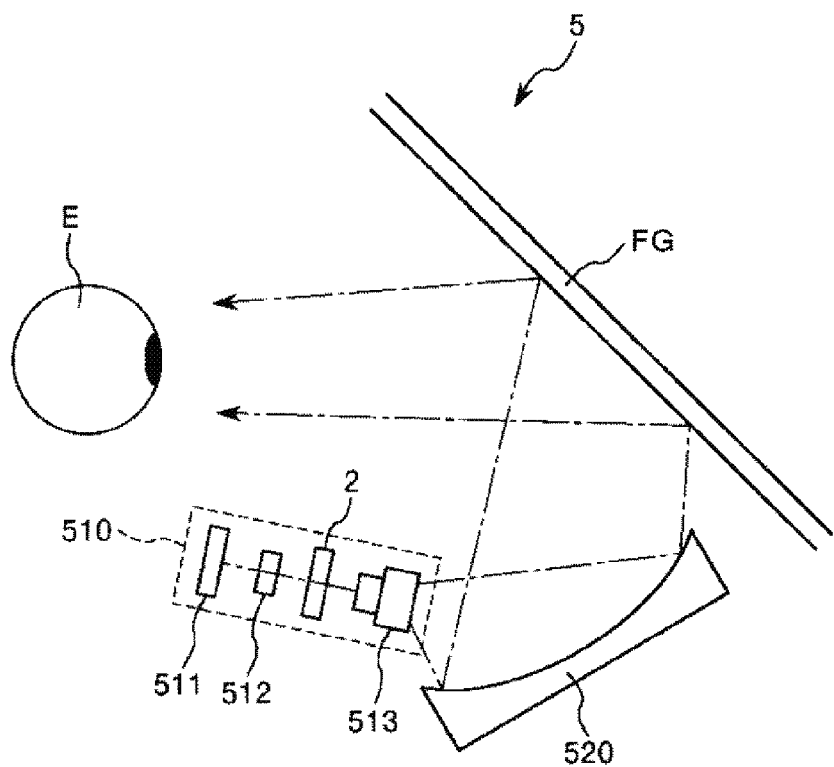
FIG. 11 is a diagram illustrating an optical configuration of an image display apparatus according to a fourth embodiment of the invention.

FIG. 11 is a diagram illustrating an optical configuration of an image display apparatus according to a fourth embodiment of the invention.

Hereinafter, the image display apparatus according to the fourth embodiment of the invention will be described. Differences from the above-described embodiment will be mainly described and the same points will not be described.

The image display apparatus according to the fourth embodiment is a head-up display (hereinafter also simply referred to as an "HUD").

An HUD (image display apparatus) 5 according to the embodiment is mounted on, for example, an automobile and is used to project various kinds of information (videos) regarding a speed per hour, a time, a traveling distance, and the like to a driver via a front glass FG. As illustrated in FIG. 11, the HUD 5 includes a projection unit 510 including a light source 511, a liquid crystal display element 512, and a projection lens system 513, a reflection mirror 520, and an optical device 2 serving as a light path deflection element. For example, the light source 511, the liquid crystal display element 512, and the projection lens system 513 can have the same configurations as the light source 310, the liquid crystal display element 320, and the projection lens system 330 according to the above-described third embodiment. The reflection mirror 520 is a concave mirror and reflects projected light from the projection unit 510 to project (display) the light to the front glass FG.

In the HUD 5 with such a configuration, the optical device 2 is disposed between the liquid crystal display element 512 and the projection lens system 513. Accordingly, the light axis of the projected light can be shifted.

Even in the above-described fourth embodiment, the same advantages as those of the above-described first embodiment can be obtained.

The optical device and the image display apparatus according to the invention have been described above according to the illustrated embodiments, but the invention is not limited thereto. For example, the configuration of each unit in the optical device and the image display apparatus according to the invention can be substituted with any configuration with the same function and any different configuration can be added.

In the above-described embodiments, the optical device in which the optical unit has the optical transparency and which is used as a pixel shift device has been described, but the use of the optical device is not limited thereto. For example, the light incident portion of the optical unit may have optical reflectivity and may be used as an optical scanner that scans light reflected from the light incident portion by swinging of the movable unit.

In the above-described embodiments, the liquid crystal projector and the light scanning type projector have been described as the image display apparatus, but the image display apparatus is not limited to the projector. The image display apparatus can also be applied to a printer, a scanner, and the like.

The entire disclosure of Japanese Patent Application No. 2015-116837, filed Jun. 9, 2015 is expressly incorporated by reference herein.

What is claimed is:

1. An optical device comprising:
    an optical unit that has a light incident surface on which light is incident;
    a movable unit that supports the optical unit;
    an axis portion that swingably supports the movable unit around a swing axis;
    a support unit that supports the axis portion;
    a permanent magnet that is provided in the movable unit; and
    a coil that generates a magnetic field to be applied to the permanent magnet,
    wherein the movable unit includes a through hole into which the permanent magnet is inserted and a protrusion portion protruding inside the through hole and supporting the permanent magnet,
    wherein, in a plan view of the movable unit, the permanent magnet includes a portion located outside an outer circumference of the coil, and wherein, in the plan view of the movable unit, the protrusion portion supports the portion of the permanent magnet located outside the outer circumference of the coil.

2. The optical device according to claim 1, wherein the permanent magnet and the coil are disposed to face each other, and
wherein the through hole is provided to be penetrated through the movable unit in an arrangement direction of the permanent magnet and the coil.

3. An image display apparatus comprising:
the optical device according to claim 2.

4. The optical device according to claim 1, wherein the protrusion portion supports a surface of the permanent magnet on a side of the coil.

5. An image display apparatus comprising:
the optical device according to claim 4.

6. The optical device according to claim 1, wherein in the plan view of the movable unit, the protrusion portion is provided not to overlap the coil.

7. The optical device according to claim 6, wherein a separate distance between the permanent magnet and the coil is less than a thickness of the protrusion portion in an arrangement direction of the permanent magnet and the coil.

8. An image display apparatus comprising:
the optical device according to claim 6.

9. An image display apparatus comprising:
the optical device according to claim 7.

10. The optical device according to claim 1, wherein in the plan view of the movable unit, the permanent magnet and the coil are each formed in a rectangular shape,
wherein both ends of the permanent magnet in a longitudinal direction are located outside the outer circumference of the coil, and
wherein the protrusion portion supports the both ends of the permanent magnet.

11. The optical device according to claim 10, wherein the permanent magnet extends in a direction intersecting in an arrangement direction of the optical unit and the permanent magnet.

12. An image display apparatus comprising:
the optical device according to claim 10.

13. An image display apparatus comprising:
the optical device according to claim 11.

14. The optical device according to claim 1, wherein the permanent magnet is provided between the two coils.

15. An image display apparatus comprising:
the optical device according to claim 14.

16. The optical device according to claim 1, wherein the optical unit transmits the light.

17. An image display apparatus comprising:
the optical device according to claim 1.

18. The image display apparatus according to claim 17, wherein the optical unit transmits the light, and
wherein a position of a pixel displayed through radiation of the light is shifted when the optical device spatially modulates the light.

19. An optical device comprising:
an optical unit that has a light incident surface on which light is incident;
a movable unit that supports the optical unit;
an axis portion that swingably supports the movable unit, the movable unit being configured to swing around a swing axis;
a support unit that supports the axis portion;
a permanent magnet that is provided in the movable unit; and
a coil that generates a magnetic field to be applied to the permanent magnet,
wherein the movable unit includes a through hole in which the permanent magnet is fixed, the movable unit includes a protrusion portion inwardly protruding to an inside of an opening of the through hole, and the protrusion portion supports the permanent magnet,
the permanent magnet has a surface facing the coil, an entire area of the surface is positioned inside the opening of the through hole, and
the protrusion portion contacts part of the surface of the permanent magnet.

20. The optical device according to claim 19, wherein, in the plan view of the movable unit, the permanent magnet and the coil are each formed in a rectangular shape,
wherein both ends of the permanent magnet in a longitudinal direction are located outside an outer circumference of the coil, and
wherein the protrusion portion supports the both ends of the permanent magnet.

* * * * *